United States Patent
Claprood et al.

(10) Patent No.: US 6,678,161 B1
(45) Date of Patent: Jan. 13, 2004

(54) FRAME CONNECTING TECHNIQUES FOR USE IN ELECTRONIC SYSTEMS

(75) Inventors: Edward Claprood, Southborough, MA (US); F. William French, Littleton, MA (US)

(73) Assignee: EMC Corporation, Hopkinton, MA (US)

( * ) Notice: Subject to any disclaimer, the term of this patent is extended or adjusted under 35 U.S.C. 154(b) by 44 days.

(21) Appl. No.: 09/996,831

(22) Filed: Nov. 29, 2001

(51) Int. Cl.[7] ................................................. G06F 1/16
(52) U.S. Cl. ........................ 361/724; 361/725; 361/727
(58) Field of Search ................... 361/724; 312/198–200, 312/223.1, 223.2, 203, 205

(56) References Cited

U.S. PATENT DOCUMENTS

| | | | |
|---|---|---|---|
| 3,877,764 A | * | 4/1975 | Hillier, Jr. ................... 312/107 |
| 5,702,166 A | * | 12/1997 | Lee ............................. 312/107 |
| 6,443,542 B1 | * | 9/2002 | Lindquist et al. ........... 312/198 |

* cited by examiner

*Primary Examiner*—Darren Schuberg
*Assistant Examiner*—Yean-Hsi Chang
(74) *Attorney, Agent, or Firm*—Chapin & Huang, L.L.C.; David E. Huang, Esq.

(57) ABSTRACT

An electronic system includes electronic circuitry having a first portion and a second portion, and an electronic cabinet assembly that houses the electronic circuitry. The electronic cabinet assembly includes a first cabinet that houses the first portion of the electronic circuitry and a second cabinet that houses the second portion of the electronic circuitry. The first cabinet includes a first frame and a first set of exterior members that mounts to the first frame. Similarly, the second cabinet including a second frame and a second set of exterior members that mounts to the second frame. The electronic cabinet assembly further includes a set of connecting members that connects to (i) the first frame of the first cabinet and (ii) the second frame of the second cabinet to hold the first frame and the second frame side-by-side and rigidly in place relative to each other.

12 Claims, 6 Drawing Sheets

FRAME CONNECTING TECHNIQUES FOR USE IN ELECTRONIC SYSTEMS

BACKGROUND OF THE INVENTION

A typical data storage system includes a frame, data storage circuitry (e.g., one or more controllers, a set of disk drives, an I/O interface, etc.) which mounts within the frame, and a set of exterior panels (e.g., a door, side panels, etc.) which mounts onto the frame. The frame provides a stable structure for positioning the data storage circuitry and the exterior panels. The data storage circuitry performs data storage operations (e.g., load and store operations). The exterior panels protect the data storage circuitry (e.g., against inadvertent damage from users or objects moving in the vicinity, tampering, etc.) and enables formation of an air stream that can flow through the frame and the data storage circuitry to remove heat.

If the data storage system is not fully populated with the maximum amount of hardware it is designed to use, the performance of the data storage system (e.g., data storage capacity, throughput, etc.) can be increased by adding more data storage circuitry (e.g., installing more disk drives, installing more controllers, etc.). However, if the data storage system is fully populated with the maximum amount of hardware it is designed to use, the performance must be increased by some other means.

One approach to increasing performance involves adding a new data storage system in the vicinity of the original data storage system. That is, another data storage system is placed next to the original data storage system. Each data storage system is provided with a unique identifier (e.g., an Ethernet address, an IP address, etc.), and external devices are configured to communicate with the two systems through a network (e.g., conventional networked communications, clustered communications, etc.).

In another approach, the original data storage system is replaced with a larger data storage system (e.g., a larger storage capacity and/or higher throughput data storage system). In this approach, the data stored within the original data storage system is copied (e.g., to a remote site), the original data storage system is removed from its installation location, the larger data storage system is installed in that location, and the copied data is loaded into the larger data storage system.

SUMMARY OF THE INVENTION

Unfortunately, there are deficiencies to the above described conventional approaches to increasing data storage system capacity. For example, in the above-described conventional approach which involves placing a new data storage system next to the original data storage system, the two data storage systems are essentially completely separate systems which results in an inefficient use of resources. That is, each data storage system unnecessarily uses a complete set of resources such as a full set of exterior panels even if the two data storage systems are place next to each other.

In the above-described conventional approach which involves trading in the original data storage system for a larger data storage system, there is an extensive amount of downtime associated with the exchange of systems. In particular, time is required to shutdown and remove the original data storage system from its installation location, and then to move the new data storage system into that installation location and configure the new data storage system. Furthermore, an additional mechanism is required to migrate data from the original data storage system to the new data storage system.

The invention is directed to frame connecting techniques that enable multiple electronic cabinets to connect with each other in a side-by-side manner thus alleviating the need for each cabinet to include a full set of exterior panels (e.g., there is no need for exterior panels between the cabinets) and enabling circuitry within one or all of the cabinets to remain operational during such connection. Accordingly, a full set of exterior panels for each cabinet is unnecessary thus avoiding the wasting of resources as in the conventional approach of placing two data storage systems next to each other (each of which has a full set of exterior panels). Additionally, there is no downtime requirement as in the conventional approach of trading in the original data storage system for a new larger data storage system since circuitry within an original cabinet can remain operational when another cabinet is connected.

One embodiment of the invention is directed to an electronic system which includes electronic circuitry having a first portion and a second portion, and an electronic cabinet assembly that houses the electronic circuitry. The electronic cabinet assembly includes a first cabinet that houses the first portion of the electronic circuitry and a second cabinet that houses the second portion of the electronic circuitry. The first cabinet includes a first frame and a first set of exterior members that mounts to the first frame. Similarly, the second cabinet including a second frame and a second set of exterior members that mounts to the second frame. The electronic cabinet assembly further includes a set of connecting members that connects to (i) the first frame of the first cabinet and (ii) the second frame of the second cabinet to hold the first frame and the second frame side-by-side and rigidly in place relative to each other. Accordingly, the first and second portions of the electronic circuitry can be placed in close proximity thus enabling a reduction of resources (e.g., alleviating the need for exterior panels between the two cabinets) compared to conventional approaches of simply placing two data storage system next to each other. Furthermore, the cabinets can be connected while one or both portions of the electronic circuitry remain in operation.

In one arrangement, the first frame defines a first cavity in which the first portion of the electronic circuitry resides, and the second frame defines a second cavity in which the second portion of the electronic circuitry resides. In this arrangement, the set of connecting members includes hardware that mounts to (i) an outer surface of the first frame which faces away from the first cavity and (ii) an outer surface of the second frame which faces away from the second cavity, when the set of connecting members connects to the first frame of the first cabinet and to the second frame of the second cabinet. Accordingly, there is no need to maneuver hardware within the cavities where it could be inadvertently dropped and cause damage to the electronic circuitry (e.g., cause a short circuit on a circuit board, inadvertently connect bus bars of a power supply, etc.).

In one arrangement, the set of connecting members connects to the first frame of the first cabinet and to the second frame of the second cabinet such that the first frame and the second frame are out of contact with each other and define a space between the first frame and the second frame which places the first frame and the second frame a predetermined distance apart from each other. Such spacing can enable better access to parts of the electronic system, e.g., enable cabinets doors to open fully, enable an I/O console such as a laptop to fully deploy from the cavities, etc.

In one arrangement, the electronic cabinet assembly further includes a set of trim members that attaches to the first frame and to the second frame to cover openings to the space between the first frame and the second frame. Accordingly, air streams flowing through the frames will not be substantially diminished due to large openings or gaps between the frames and thus provide adequate cooling to the portions of the electronic circuitry.

In one arrangement, the set of connecting members includes (i) a set of bottom members that attaches to a bottom portion of the first frame and to a bottom portion of the second frame; and (ii) a top member that attaches to a top portion of the first frame and to a top portion of the second frame. The set of bottom members and the top member enable the frames to connect at both the top and bottom for improved structural stability.

In one arrangement, the set of bottom members includes a strap that attaches to the first and second frames and over a set of floor mounting brackets to prevent removal of the set of floor mounting brackets from the first and second frames while the strap attaches to the first and second frames. Accordingly, the set of floor mounting brackets, which may be required to support the frames, cannot be inadvertently removed.

In one arrangement, the first frame defines a first set of slots and a first set of threaded holes, and the second frame defines a second set of slots and a second set of threaded holes. In this arrangement, the top member includes a first set of tabs that is configured to insert into the first set of slots defined by the first frame, a second set of tabs that is configured to insert into the second set of slots defined by the second frame, and an intermediate portion that couples to the first and second sets of tabs. The intermediate portion defines a set of holes, each of which substantially aligns with a corresponding threaded hole of the first and second sets of threaded holes when the first set of tabs inserts into the first set of slots and the second set of tabs inserts into the second set of slots. Accordingly, the tabs can facilitate alignment and proper placement of the top member relative to the frames. Additional hardware (e.g., screws) can then be installed through the top member into the sets of threaded holes to secure the top member to the frames.

The features of the invention, as described above, may be employed in data storage systems, devices and methods, as well as other computer-related components such as those of EMC Corporation of Hopkinton, Mass.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to frame connecting techniques that enable multiple electronic cabinets to connect with each other in a side-by-side manner thus alleviating the need for each cabinet to include a full set of exterior panels (e.g., there is no need for exterior panels between the cabinets) and enabling circuitry within one or all of the cabinets to remain operational during such connection. Accordingly, a full set of exterior panels for each cabinet is unnecessary thus avoiding the wasting of resources as in a conventional approach of placing two data storage systems next to each other (each of which has a full set of exterior panels). Furthermore, there is no downtime requirement as in a conventional approach of trading in the original data storage system for a new larger data storage system since circuitry within an original cabinet can remain operational when another cabinet is connected.

Figure 1:
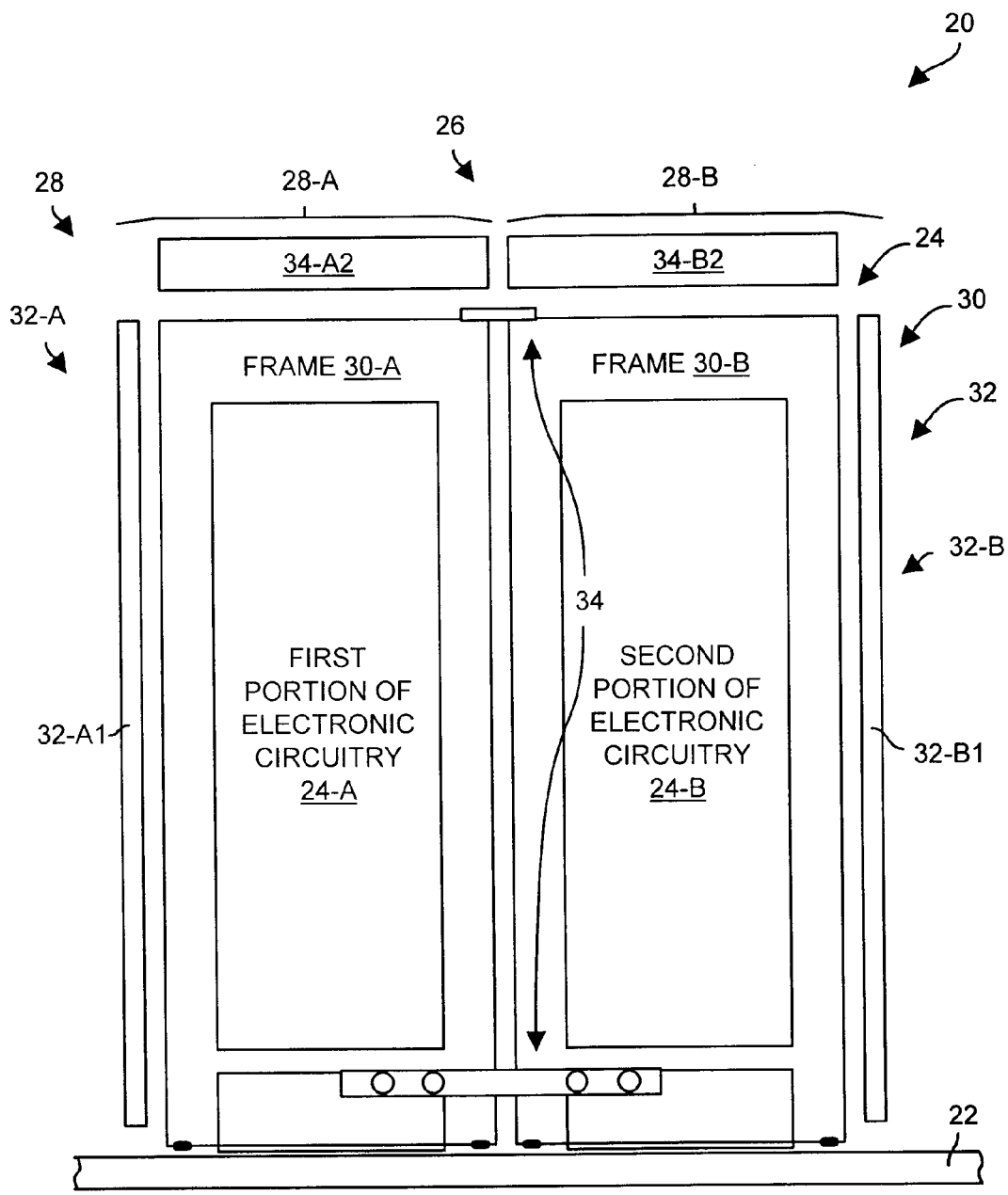
FIG. 1 is a general view of an electronic system which is suitable for use by the invention.

FIG. 1 shows an electronic system 20 (e.g., a data storage system) which is suitable for use by the invention. As shown, the electronic system 20 resides on an installation location 22 (e.g., a footprint on a floor surface).

The electronic system 20 includes electronic circuitry 24 and an electronic cabinet assembly 26. The electronic circuitry 24 includes a first portion 24-A and a second portion 24-B (e.g., for increased capacity or throughput, for redundancy, etc.). There is no requirement that the first portion 24-A include similar circuitry to that of the second portion 24-B. Rather, the first and second portions 24-A, 24-B can include different types of circuits (e.g., data storage devices for one portion, processors and memory for another portion). The electronic cabinet assembly 26 includes multiple cabinets 28. In particular, the electronic cabinet assembly 26 includes a first cabinet 28-A and a second cabinet 28-B.

Each cabinet 28 includes a frame 30 and a set of exterior members 32 that mounts to that frame 30. For example, the first cabinet 28-A includes a first frame 30-A and a first set of exterior members 32-A such as a side panel 32-A1, a muffler 32-A2, etc. Similarly, the second cabinet 28-B includes a second frame 30-B and a second set of exterior members 32-B such as a side panel 32-B1, a muffler 32-B2, etc.

The electronic cabinet assembly 26 further includes a set of connecting members 34 which connects to (i) the first frame 30-A of the first cabinet 28-A and (ii) the second frame 30-B of the second cabinet 28-B. The set of connecting members 34 holds the first frame 30-A and the second frame 30-B side-by-side and rigidly in place relative to each other.

Furthermore, each cabinet 28 houses a portion of the electronic circuitry 24. For example, the first cabinet 28-A houses the first portion 24-A of the electronic circuitry 24. Similarly, the second cabinet 28-B houses the second portion 24-B of the electronic circuitry 24.

It should be understood that the electronic system 20 includes multiple cabinets 28. However, each cabinet 28 does not need a complete set of exterior members 32. For example, it is unnecessary for there to be exterior members 32 (e.g., side panels) between the two cabinets 28-A, 28-B since the set of connecting members 34 holds the cabinets 28 side-by-side and rigidly in place relative to each other. Further details of the invention will now be provided with reference to FIGS. 2 through 4.

Figure 2:
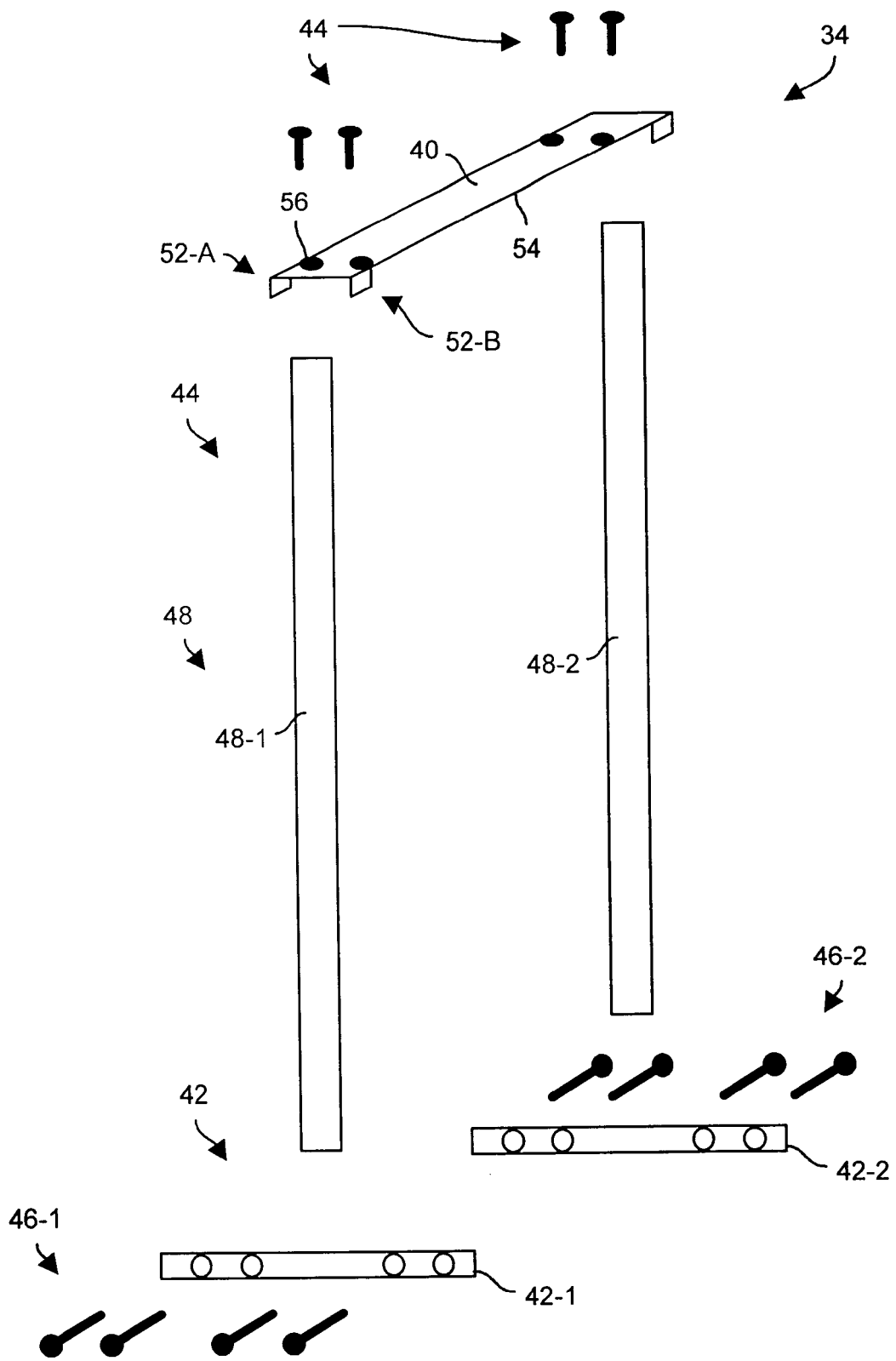
FIG. 2 is a general view of a set of connecting members of the electronic system of FIG. 1.
Figure 3:
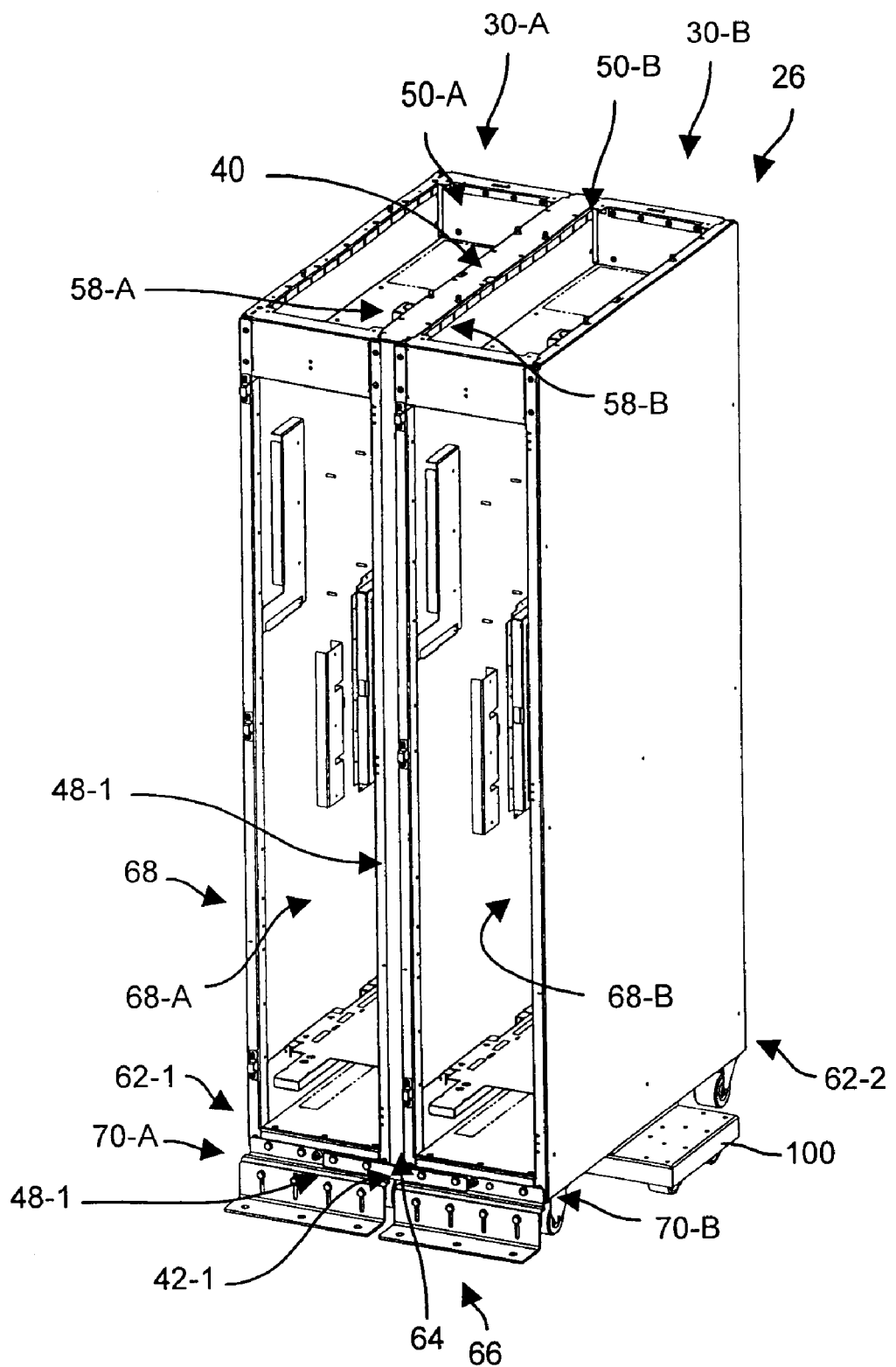
FIG. 3 is a perspective view of the particular portions of the electronic system of FIG. 1.

FIG. 2 shows a view of the set of connecting members 34 of the electronic system 20. The set of connecting members 34 includes a top member 40, a set of bottom members 42, hardware 44, 46 (e.g., #8 size screws or bolts) and a set of trim members 48. As shown in FIG. 3, these components 40, 42, 44, 46, 48 work together to properly and rigidly position the first and second cabinets 28 (i.e., the first and second frames 30-A, 30-B) relative to each other. In particular, the top member 40 and the hardware 44 are configured to attach to a top portion 50-A of the first frame 30-A and to a top portion 50-B of the second frame 30-B in order to rigidly position the first and second frames 30-A, 30-B relative to each other. To this end, the top member 40 includes a first set of tabs 52-A (see FIG. 2), a second set of tabs 52-B, and an intermediate portion 54. The intermediate portion 54 couples the first and second sets of tabs 52-A, 52-B together, and defines a set of holes 56.

Figure 4:
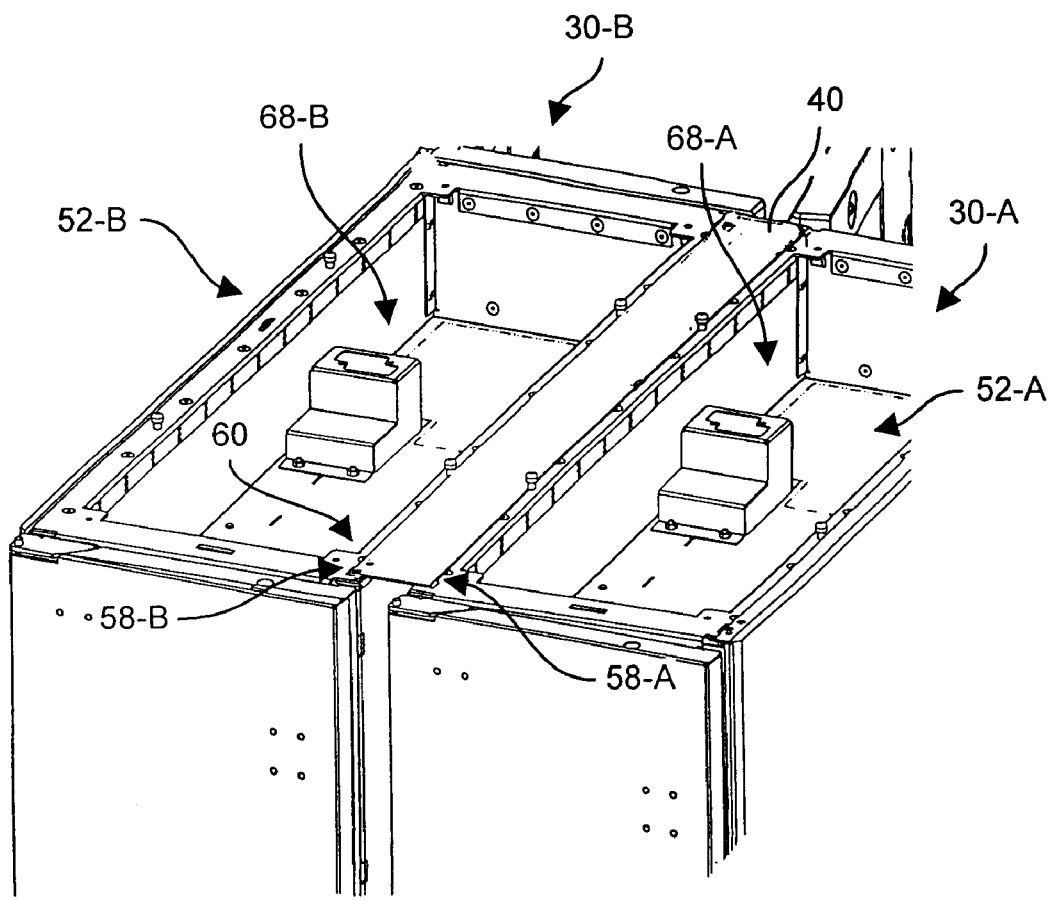
FIG. 4 is a perspective view of a top region of the electronic system of FIG. 1.

FIG. 4 shows a detailed reverse angle view of the top portions 50-A, 50-B of the first and second frames 30-A, 30-B. When a user connects cabinets together using the top member 40, the first set of tabs 52-A of the top member 40 is configured to insert into a first set of slots 58-A defined by the first frame 30-A. Similarly, the second set of tables 50-B is configured to insert into a second set of slots 58-B define by the second frame 30-B. Insertion of the tabs 50-A, 50-B into these frame slots 58-A, 58-B properly orients and aligns the top member 40 such that the set of holes 56 aligns with threaded holes (shown generally by the arrow 60 in FIG. 4) in the frames 30-A, 30-B. Accordingly, the user can fasten the top member 40 securely to the frames 30-A, 30-B using the hardware 44 (e.g., threaded bolts or screws).

With reference back to FIGS. 2 and 3, the set of bottom members 42 fasten to bottom portions 62-1, 62-2 of the frames 30-A, 30-B. In particular, the set of bottom members 42 includes a first strap 42-1 (e.g., 0.25 inch metal strapping) that fastens to the bottom portions 62-1 of the front of the cabinets 28 (e.g., underneath front doors of the cabinets 28) using a first set 46-1 of the hardware 46, and a second strap 42-2 that fastens to bottom portions 62-2 of the rear of the cabinets 28 (e.g., underneath rear doors of the cabinets 28) using a second set 46-2 of the hardware 46. In one arrangement, at least one of the straps 42 attaches over a set of mounting brackets 66 (e.g., floor clamps for earthquake protection, wheel locks, etc.). Accordingly, the set of mounting brackets 66 do not need to be removed and installation of each strap 42 further prevents removal of the set of floor mounting brackets 66 from the first and second frames 30-A, 30-B.

The set of trim members 48 includes a first trim member 48-1 that attaches to the frames 30-A, 30-B to cover an opening between the fronts of the cabinets 28. The set of trim members 48 further includes a second trim member 48-2 that attaches to the frames 30-A, 30-B to cover another opening between the rears of the cabinets 28. Accordingly, air streams within the cabinets 28 can be fully formed (i.e., without substantial leakage) in order to adequately remove heat from the electronic circuitry 24 housed within the cabinets 28.

It should be understood that the set of connecting members 34 positions the first frame 30-A and the second frame 30-B such that the first frame 30-A and the second 30-B frame are out of contact with each other. Additionally, the first and second frames 30-A, 30-B define a space 64 thus placing the first frame 30-A and the second frame 30-B a predetermined distance apart from each other (e.g., any distance within a range of distances from 0.50 to 1.5 inches). Such spacing enables better access to parts of the electronic system 20. For instance, without such spacing, cabinet doors may be unable to open fully (e.g., beyond 90 degrees), and I/O consoles may be unable to completely fold out from the cabinets into a substantially horizontal position. However, with such spacing, the cabinet doors can easily fully open (e.g., beyond 90 degrees) and the I/O consoles can easily fully deploy into their proper horizontal positions.

It should be further understood that the first frame 30-A defines a first cavity 68-A in which the first portion 24-A of the electronic circuitry 24 resides, and the second frame 30-B defines a second cavity 68-B in which the second portion 24-B of the electronic circuitry 24 resides. It should be further understood that the hardware 44, 46 of the set of connecting members 34 mounts to (i) an outer surface 70-A of the first frame 30-A which faces away from the first cavity 68-A and (ii) an outer surface 70-B of the second frame 30-B which faces away from the second cavity 68-B, when the set of connecting members 34 connects to the frames 30-A, 30-B. As a result, there is little or no need to maneuver the hardware 44, 46 within the cavities 68-A, 68-B where it could be inadvertently dropped and cause damage to the electronic circuitry 24, e.g., cause a short circuit on a circuit board (a front-end processor, a back-end process, a memory board, etc.), inadvertently connect bus bars of a power supply, etc. That is, there is no need any hardware to be manipulated within the cavities 68 (e.g., no bolts are needed to bolt the frames 30 together from the inside) which could be dropped into the cavities. Rather, all of the connecting activity can occur outside the cavities 68 in a neat and orderly manner. Further details of the invention will now be provided with reference to FIG. 5.

Figure 5:
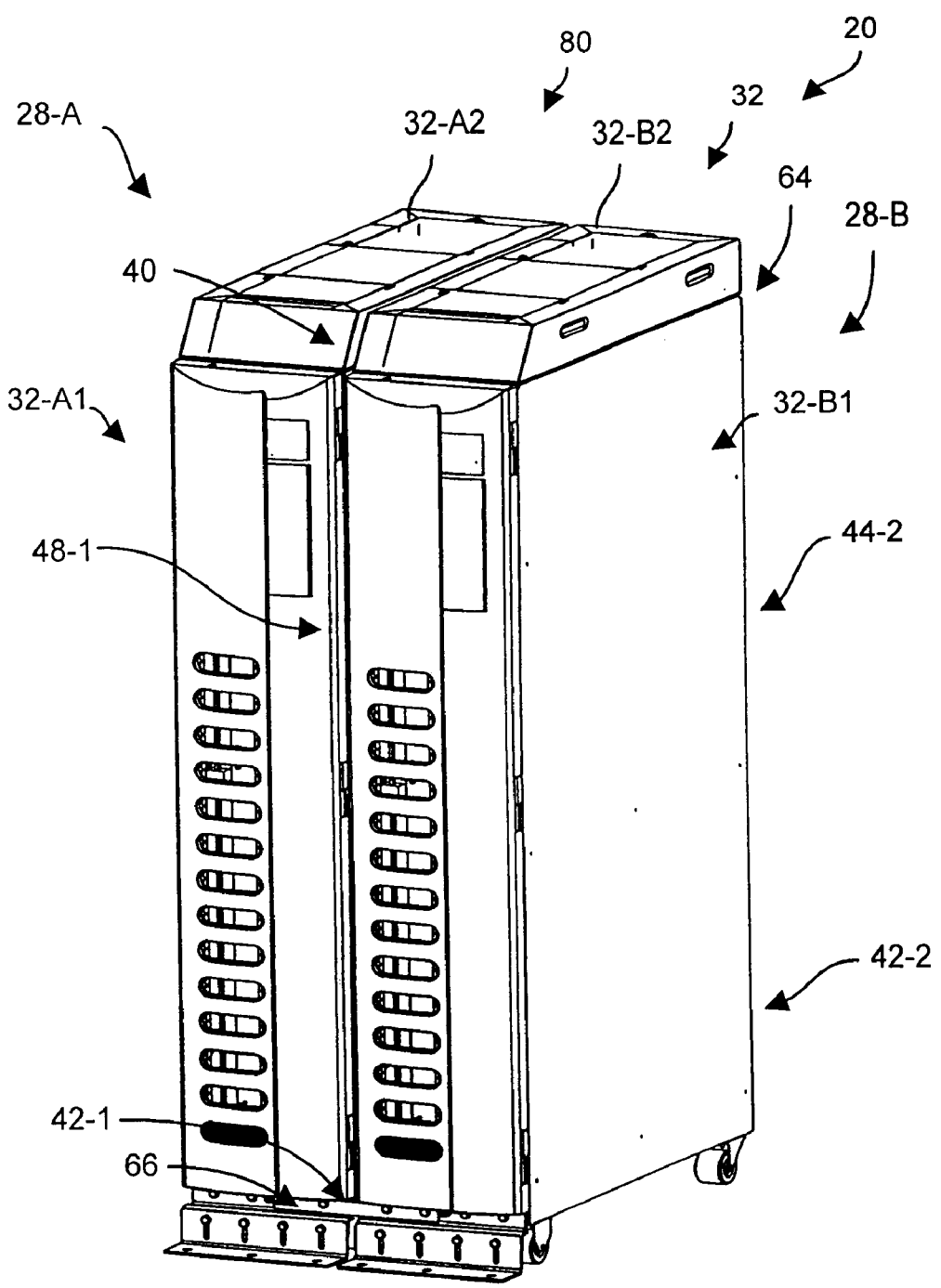
FIG. 5 is a perspective view of the electronic system of FIG. 1 when exterior panels are installed.

FIG. 5 shows a perspective view 80 of the electronic system 20 when the exterior members 32 are installed. The exterior members 32 (which include cabinet doors, top covers/mufflers and side panels) provide protection to the electronic circuitry 24 (as well as to bystanders), and enable air streams to be formed within the cabinets 28 which house the electronic circuitry 24 in order to cool the electronic circuitry 24. There is no need for exterior members between the cabinets 28. Accordingly, resources (e.g., exterior member) are not wasted.

Figure 6:
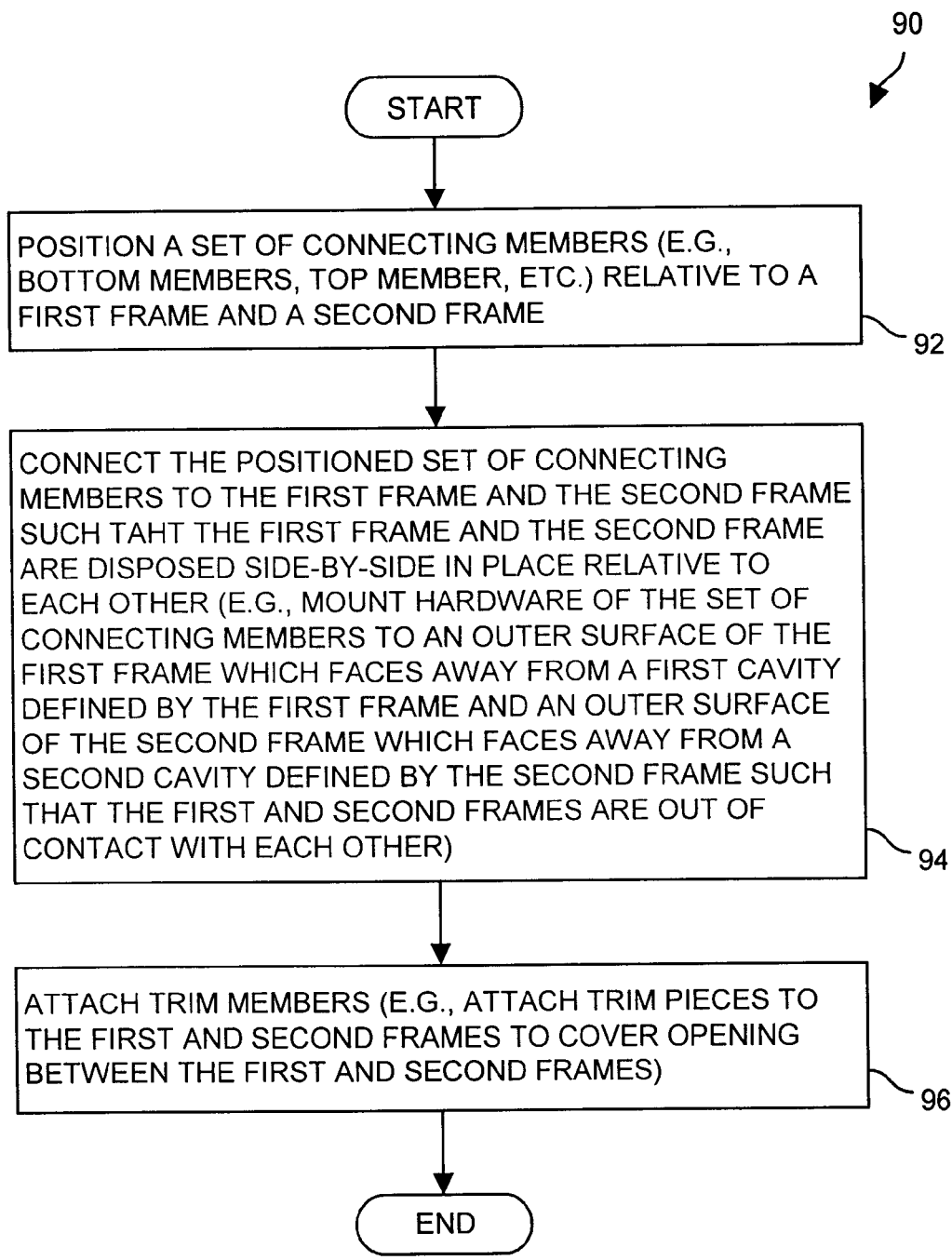
FIG. 6 is a flowchart of a procedure for connecting multiple frames which house portions of electronic circuitry.

FIG. 6 is a flowchart of a procedure 90 which is performed by a user to connect the frames 30-A, 30-B (also see FIG. 1) which house the portions 24-A, 24-B of the electronic circuitry 24. In step 92, the user positions the set of connecting members 34 relative to the first and second frames 30-A, 30-B. In particular, the user places the top member 40 into its proper position by inserting the sets of tabs 52 into their corresponding frame slots 50 (see FIGS. 2 through 4).

In step 94, the user connects the positioned set of connecting members 34 to the first and second frames 30-A, 30-B such that the first and second frames 30-A, 30-B are disposed side-by-side in place relative to each other. In particular, the user mounts the hardware 44, 46 (see FIG. 2) to the outer surfaces 70 of the frames 30-A, 30-B. As shown in FIG. 3, these outer surfaces 70 face away from the cavities 68 which house the electronic circuitry 24. Accordingly, the user can connect the cabinets together without intruding into the cavities 68 which house the electronic circuitry 24. As a result, the electronic circuitry 24 within the cabinets 28 can remain operational during connection and the user does not need to manipulate the hardware 44, 46 within the cavities 68.

Thus the likelihood that the user will inadvertently damage the electronic circuitry 24 during installation of the set of connecting members 34 is minimal or non-existent (e.g., it is unlikely that the user will drop the hardware 44, 46 into the cavities 68 where it can cause damage to the electronic circuitry 24 such as an electrical short).

In step 96, the user attaches the trim members 48. In particular, the user fastens the trim members 48 to the frames 30-A, 30-B to cover openings between the frames 30-A, 30-B. Accordingly, there is little or no leakage when air streams are formed within the cabinets 28 to remove heat from the electronic circuitry 24 during operation of the electronic system 20.

As described above, the invention is directed to frame connecting techniques that enable multiple cabinets 28 to connect with each other in a side-by-side manner thus alleviating the need for each cabinet 28 to include a full set of exterior panels (e.g., there is no need for exterior panels between the cabinets 28) and enabling circuitry 24 within one or all of the cabinets 28 to remain operational during such connection. Accordingly, a full set of exterior panels for each cabinet 28 is unnecessary thus avoiding the wasting of resources as in a conventional approach of placing two data storage systems next to each other (each of which has a full set of exterior panels). Furthermore, when increasing system capacity by adding another cabinet 28 containing additional circuitry, there is no downtime requirement as in a conventional approach of trading in the original data storage system for a new larger data storage system since circuitry within an original cabinet can remain operational when another cabinet is connected. The features of the invention, as described above, may be employed in electronic systems, components and procedures such as those of EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the electronic system 20 was described above as a data storage system by way of example only. In other arrangements, the electronic system 20 is a general purpose computer system, a data communications system, an analog circuitry system, a measuring device, audio/video equipment, combinations thereof and the like.

Additionally, it should be understood that the electronic system 20 included two cabinets 28 which connect together using a set of connecting members 34 by way of example only. In other arrangements, there are more than two cabinets 28 which connect together in this manner. In such arrangements, additional cabinets 28 can be connected in a row to form a series of cabinets 28. There is no need for external members to reside between the cabinets 28 thus saving resources. Furthermore, the set of connecting members 34 can be attached while the original equipment remains powered up and operational thus avoiding downtime since the connecting members attach to the outer surface of the frames 30 and do not need to intrude into the cavities 68 which house the electronic circuitry 24.

Furthermore, it should be understood that the above-described frame connecting techniques are well-suited for connecting relatively small footprint cabinets (i.e., cabinets which occupy only a small or narrow installation location 22, also see FIG. 1). For example, some small footprint cabinets, which tend to require cross-braces (see the cross-brace 100 in FIG. 3), for support against inadvertently tipping over, no longer require such cross-braces when connected to another cabinet (i.e., when two or more of the cabinets are connected together). Such modifications and enhancements are intended to be within the scope of the invention which is only limited by the claims.

What is claimed is:

1. An electronic cabinet assembly for housing electronic circuitry, the electronic cabinet assembly comprising:
   a first cabinet that houses a first portion of the electronic circuitry, the first cabinet including a first frame and a first set of exterior members that mounts to the first frame;
   a second cabinet that houses a second portion of the electronic circuitry, the second cabinet including a second frame and a second set of exterior members that mounts to the second frame; and
   a set of connecting members that connects to (i) the first frame of the first cabinet and (ii) the second frame of the second cabinet to hold the first frame and the second frame side-by-side and rigidly in place relative to each other,
   wherein the first frame defines a first cavity in which the first portion of the electronic circuitry resides; wherein the second frame defines a second cavity in which the second portion of the electronic circuitry resides; and wherein the set of connecting members includes:
      hardware that mounts to (i) an outer surface of the first frame which faces away from the first cavity and (ii) an outer surface of the second frame which faces away from the second cavity, when the set of connecting members connects to the first frame of the first cabinet and to the second frame of the second cabinet and
      a first side strap and a second side strap, the hardware being configured to (i) simultaneously fasten the first side strap over the outer surface of the first frame which faces away from the first cavity and the outer surface of the second frame which faces away from the second cavity on a first side of the electronic assembly, and (ii) simultaneously fasten the second side strap flush against the outer surface of the first frame which faces away from the first cavity and the outer surface of the second frame which faces away from the second cavity on a second side of the electronic assembly, the second side of the electronic assembly being opposite the first side of the electronic assembly.

2. The electronic cabinet assembly of claim 1 wherein the set of connecting members connects to the first frame of the first cabinet and to the second frame of the second cabinet such that the first frame and the second frame (i) are out of contact with each other and define a space between the first frame and the second frame placing the first frame and the second frame a predetermined distance apart from each other.

3. The electronic cabinet assembly of claim 2, further comprising:
   a set of trim members that attaches to the first frame and to the second frame to cover openings to the space between the first frame and the second frame.

4. The electronic cabinet assembly of claim 1 wherein each of the first and second side straps is configured to attach to a bottom portion of the first frame and to a bottom portion of the second frame; and wherein the set of connecting members further includes:
   a top member that attaches to a top portion of the first frame and to a top portion of the second frame.

5. The electronic cabinet assembly of claim 1 wherein the first side strap is:
   a planar-shaped strap, the hardware being configured to simultaneously fasten the planar-shaped strap over the outer surface of the first frame which faces away from the first cavity and over the outer surface of the second frame which faces away from the second cavity.

6. An electronic cabinet assembly for housing electronic circuitry, the electronic cabinet assembly comprising:
a first cabinet that houses a first portion of the electronic circuitry, the first cabinet including a first frame and a first set of exterior members that mounts to the first frame;
a second cabinet that houses a second portion of the electronic circuitry, the second cabinet including a second frame and a second set of exterior members that mounts to the second frame; and
a set of connecting members that connects to (i) the first frame of the first cabinet and (ii) the second frame of the second cabinet to hold the first frame and the second frame side-by-side and rigidly in place relative to each other;
wherein the set of connecting members includes a set of bottom members that attaches to a bottom portion of the first frame and to a bottom portion of the second frame, and a top member that attaches to a top portion of the first frame and to a top portion of the second frame; and
wherein the set of bottom members includes a strap that attaches to the first and second frames and over a set of floor mounting brackets to prevent removal of the set of floor mounting brackets from the first and second frames while the strap attaches to the first and second frames.

7. An electronic cabinet assembly for housing electronic circuitry, the electronic cabinet assembly comprising:
a first cabinet that houses a first portion of the electronic circuitry, the first cabinet including a first frame and a first set of exterior members that mounts to the first frame;
a second cabinet that houses a second portion of the electronic circuitry, the second cabinet including a second frame and a second set of exterior members that mounts to the second frame; and
a set of connecting members that connects to (i) the first frame of the first cabinet and (ii) the second frame of the :second cabinet to hold the first frame and the second frame side-by-side and rigidly in place relative to each other;
wherein the set of connecting members includes a set of bottom members that attaches to a bottom portion of the first frame and to a bottom portion of the second frame, and a top member that attaches to a top portion of the first frame and to a top portion of the second frame; and
wherein the first frame defines a first set of slots and a first set of threaded holes, wherein the second frame defines a second set of slots and a second set of threaded holes, and wherein the top member includes:
a first set of tabs that is configured to insert into the first set of slots defined by the first frame;
a second set of tabs that is configured to insert into the second set of slots defined by the second frame; and
an intermediate portion that couples to the first and second sets of tabs, the intermediate portion defining a set of holes each of which substantially aligns with a corresponding threaded hole of the first and second sets of threaded holes when the first set of tabs inserts into the first set of slots and the second set of tabs inserts into the second set of slots.

8. A method for connecting a first frame that houses a first portion of electronic circuitry and a second frame that houses a second portion of the electronic circuitry, the method comprising the steps of:
positioning a set of connecting members relative to the first frame and the second frame; and
connecting the positioned s:et of connecting members to the first frame and to the second frame such that the first frame and the second frame are disposed side-by-side and held rigidly in place relative to each other;
wherein the set of connecting members includes a set of bottom members and a top member, and wherein the step of connecting includes the step of:
attaching the set of bottom members to a bottom portion of the first frame and to a bottom portion of the second frame; and
attaching the top member to a top portion of the first frame and to a top portion of the second frame; and
wherein the set of bottom members includes a strap, and wherein the step of attaching the set of bottom members includes the step of:
attaching the strap to the first and second frames and over a set of floor mounting brackets to prevent removal of the set of floor mounting brackets from the first and second frames.

9. A method for connecting a first frame that houses a first portion of electronic circuitry and a second frame that houses a second portion of the electronic circuitry, the method comprising the steps of:
positioning a set of connecting members relative to the first frame and the second frame; and
connecting the positioned set of connecting members to the first frame and to the second frame such that the first frame and the second frame are disposed side-by-side and held rigidly in place relative to each other;
wherein the set of connecting members includes a set of bottom members and a top member, and wherein the step of connecting includes the step of:
attaching the set of bottom members to a bottom portion of the first frame and to a bottom portion of the second frame; and
attaching the top member to a top portion of the first frame and to a top portion of the second frame; and
wherein the first frame defines a first set of slots and a first set of threaded holes, wherein the second frame defines a second set of slots and a second set of threaded holes, and wherein the step of attaching the top member includes the step of:
inserting a first set of tabs of the top member into the first set of slots defined by the first frame and inserting a second set of tabs of the top member into the second set of slots defined by the second frame such that each of a set of holes defined in an intermediate portion of the top member substantially aligns with a corresponding threaded hole of the first and second sets of threaded holes; and
threading a set of threaded members through the set of holes defined by the intermediate portion of the top member and into the first and second sets of threaded holes to fasten the top member to the first and second frames.

10. A method for connecting a first frame that houses a first portion of electronic circuitry and a second frame that houses a second portion of the electronic circuitry, the method comprising the steps of:

positioning a set of connecting members relative to the first frame and the second frame; and connecting the positioned set of connecting members to the first frame and to the second frame such that the first frame and the second frame are disposed side-by-side and held rigidly in place relative to each other;

wherein the step of positioning includes the step of locating the set of connecting members relative to the first frame and the second frame while the first and second portions of the electronic circuitry are in operation, and wherein the step of connecting includes the step of fastening the set of connecting members to the first frame and to the second frame while the first and second portions of the electronic circuitry are in operation.

11. A connecting kit for connecting a first frame and a second frame of an electronic cabinet assembly, the first frame defining a first cavity to house a first portion of electronic circuitry, the second frame defining a second cavity to house a second portion of the electronic circuitry, the connecting kit comprising:

a set of connecting members that connects to the first frame and to the second frame such that the first frame and the second frame are disposed side-by-side and held rigidly in place relative to each other, the set of connecting members including.

hardware which is configured to mount to (i) an outer surface of the first frame which faces away from the first cavity and (ii) an outer surface of the second frame which faces away from the second cavity, when the set of connecting members connects to the first frame of the first cabinet and to the second frame of the second cabinet, and a first side strap and a second side strap, the hardware being configured to (i) simultaneously fasten the first side strap over the outer surface of the first frame which faces away from the first cavity and the outer surface of the second frame which faces away from the second cavity on a first side of the electronic assembly, and (ii) simultaneously fasten the second side strap flush against the outer surface of the first frame which faces away from the first cavity and the outer surface of the second frame which faces away from the second cavity on a second side of the electronic assembly, the second side of the electronic assembly being opposite the first side of the electronic assembly.

12. The connecting kit of claim 11 wherein the first side strap is:

a planar-shaped strap, the hardware being configured to simultaneously fasten the planar-shaped strap over the outer surface of the first frame which faces away from the first cavity and over the outer surface of the second frame which faces away from the second cavity.

* * * * *

UNITED STATES PATENT AND TRADEMARK OFFICE
CERTIFICATE OF CORRECTION

PATENT NO. : 6,678,161 B1
DATED : January 13, 2004
INVENTOR(S) : Edward Claprood and F. William French It is certified that error appears in the above-identified patent and that said Letters Patent is hereby corrected as shown below:

Column 8,
Line 29, "cabinet and" should read -- cabinet, and --.

Column 9,
Line 44, "the :second cabinet" should read -- the second cabinet --.

Column 10,
Line 7, "positioned s:et of" should read -- positioned set of --.

Column 11,
Line 25, "members including." should read -- members including: --.

Signed and Sealed this

Fifteenth Day of June, 2004

JON W. DUDAS
*Acting Director of the United States Patent and Trademark Office*